April 24, 1951 R. CLARK 2,550,533
MINNOW BUCKET
Filed June 16, 1947 5 Sheets-Sheet 4
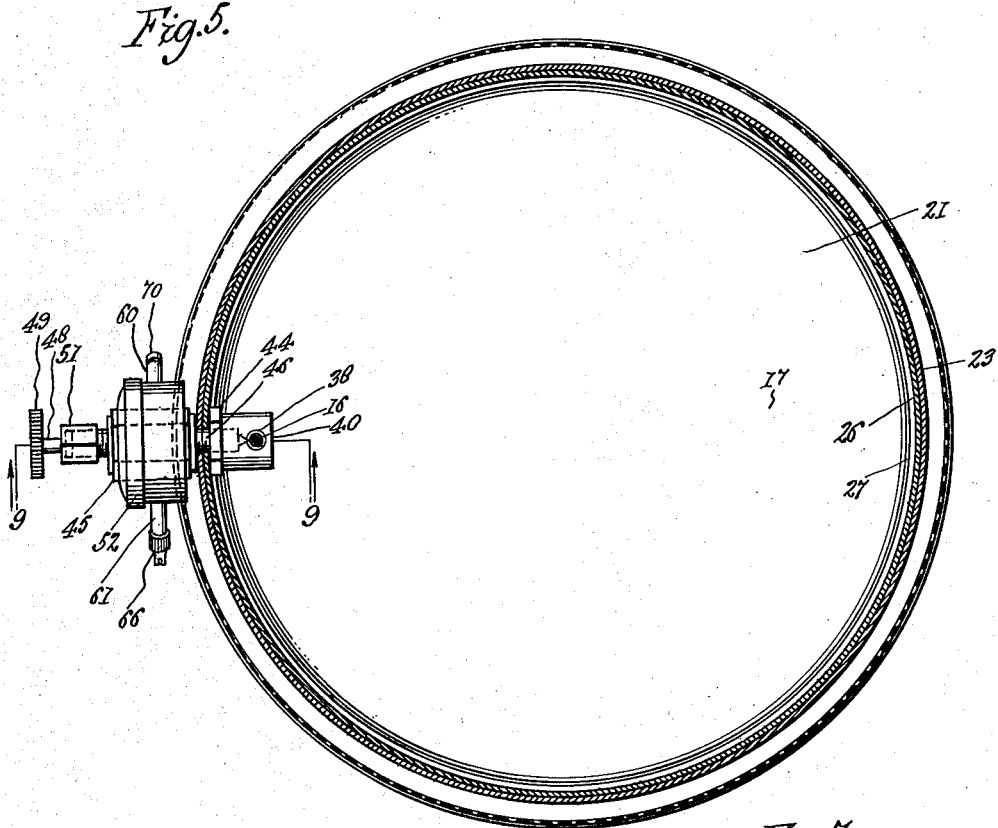
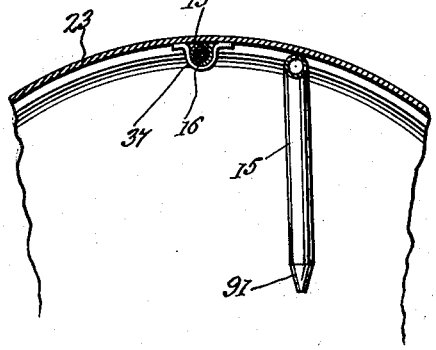
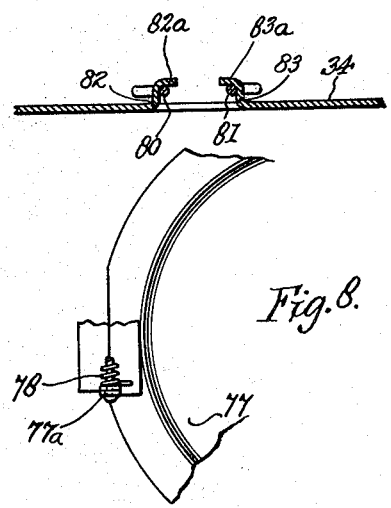
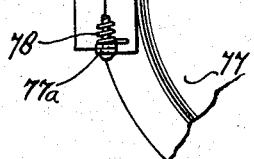
INVENTOR.
Reid Clark
BY Wilkinson & Mawhinney
ATTORNEYS.

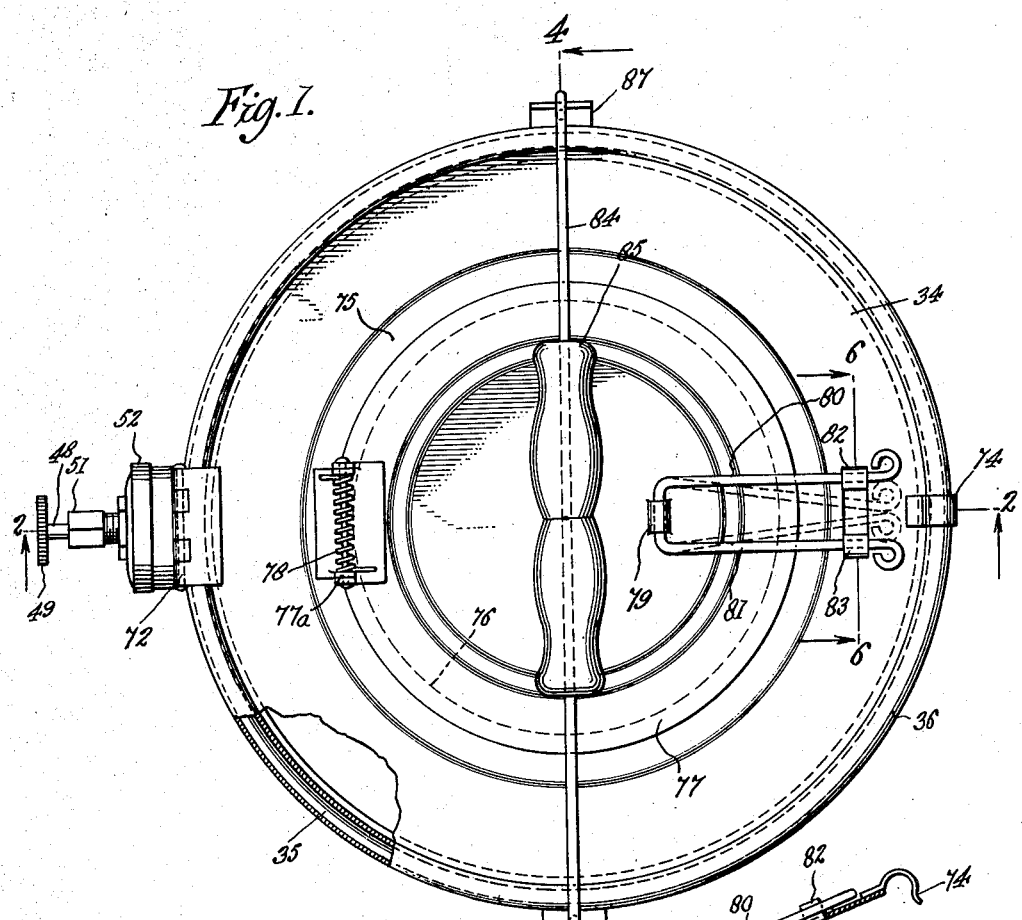
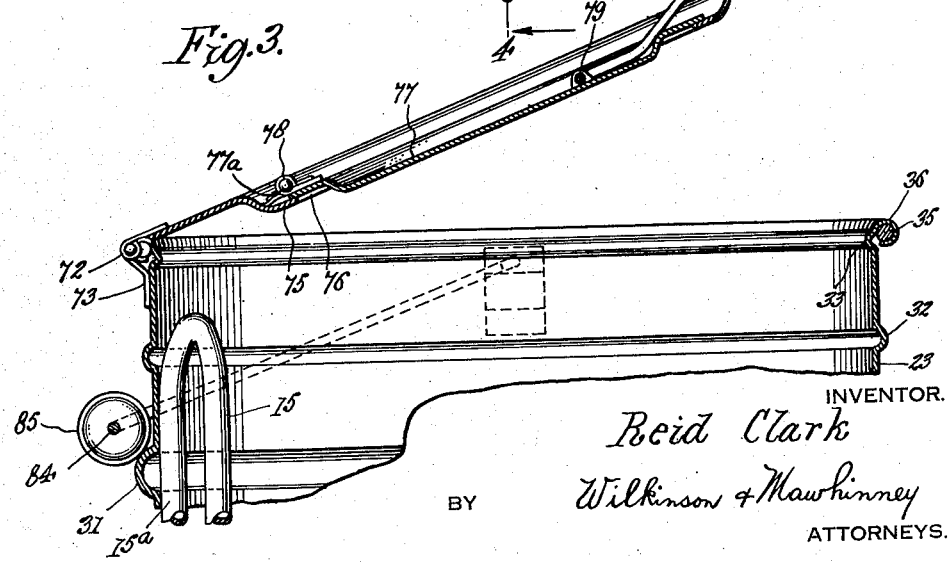

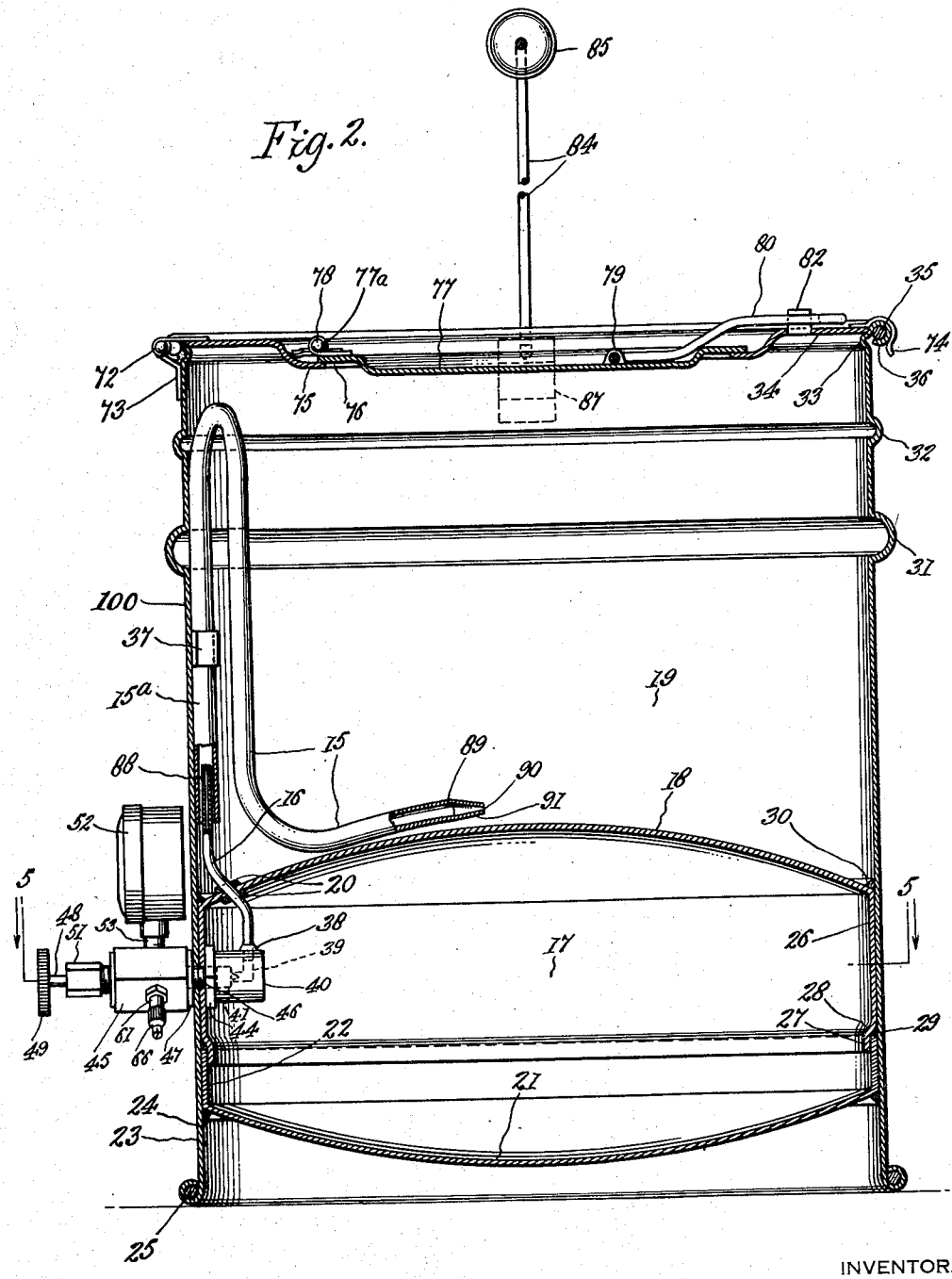

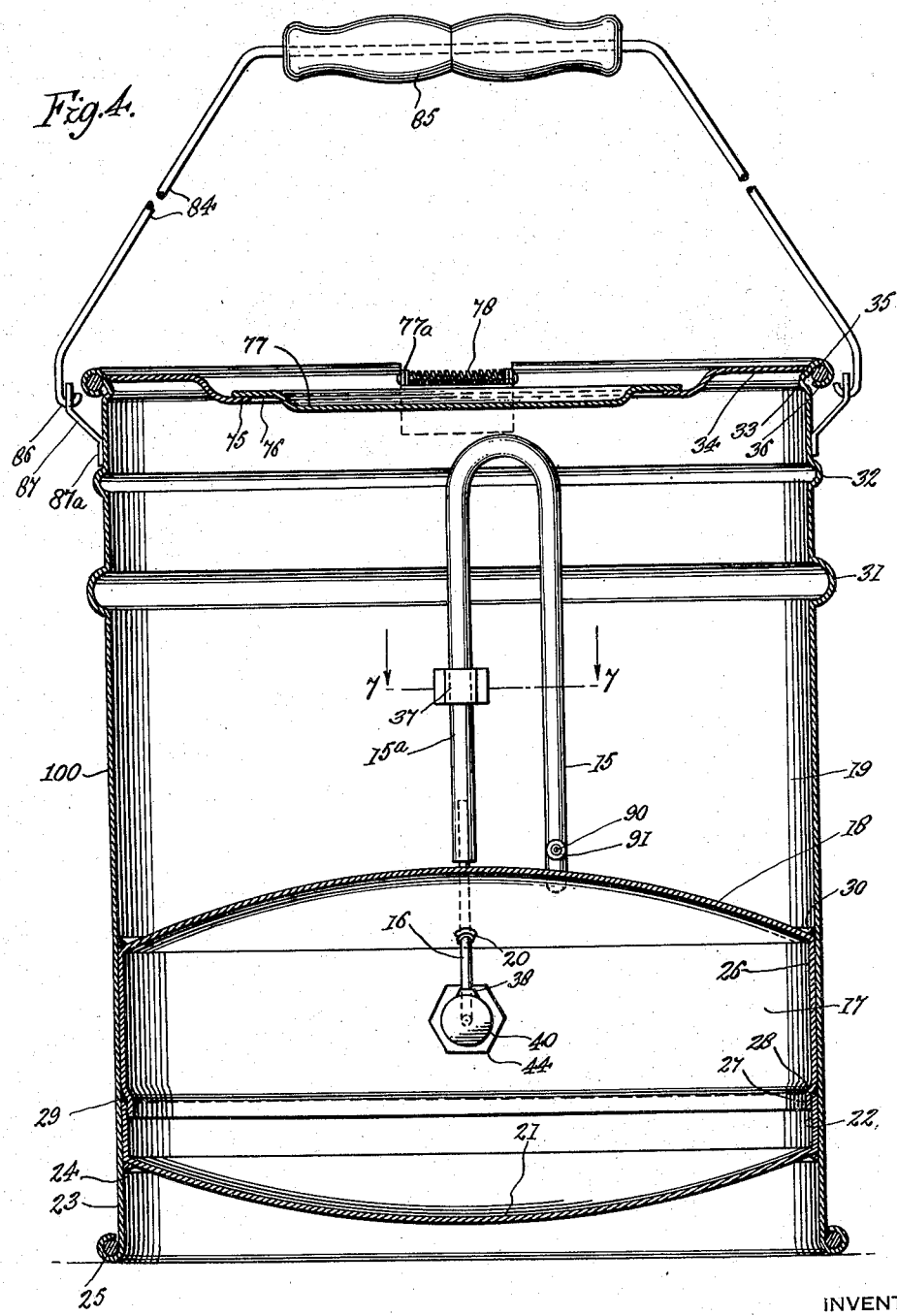

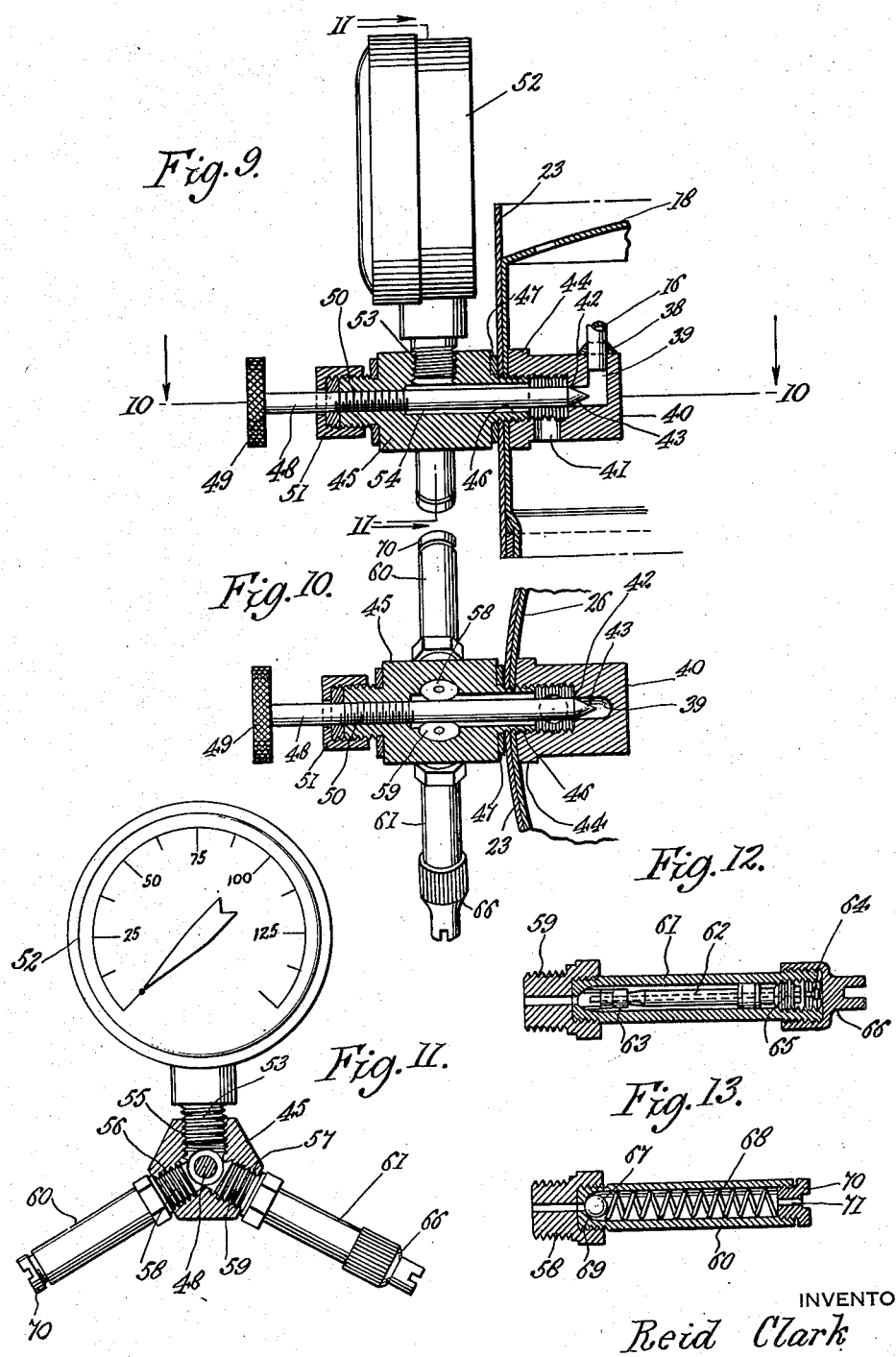

Patented Apr. 24, 1951

2,550,533

UNITED STATES PATENT OFFICE 2,550,533

MINNOW BUCKET

Reid Clark, Camden, Ala., assignor, by decree of court, to Thelma Clark

Application June 16, 1947, Serial No. 754,952

5 Claims. (Cl. 43—57)

The present invention relates to improvements in minnow buckets, and the present application is a continuation-in-part of my similarly entitled copending application filed August 2, 1946, Serial No. 688,085, which is now abandoned.

An object of the present invention is to produce an improved minnow bucket in which provision is made for automatically and continuously aerating the water to preserve the minnows in a live and proper state in which they constitute the most efficient bait.

Another object of the invention is to provide an improved minnow bucket in which by a hydrosiphon action the water in the water compartment of the bucket may be constantly recycled through an aerating system which will have a twofold aerating action in that compressed air introduced to a column of water isolated from the body of water in the water tank or compartment tends not only by a siphoning action to cause a circulation of water in the water tank and through the siphoning system but it also contributes a primary aerating action, and in the second place by this same compressed air siphoning action combined with a restricted discharge nozzle the aerated column of water and air particles may be caused to acquire a certain developed back pressure which will cause the aerated water mixture to be discharged in a form resembling spray or mist through a reduced discharge orifice and thereby perform a secondary aerating action.

A further object of the invention is to provide an improved minnow bucket so constructed and arranged as to receive an installation of compressed air equipment and the necessary valves for the control thereof whereby the bucket will be self sufficient over an extended period of time so far as its double aerating function is involved.

A still further object of the invention is to provide an improved minnow bucket which incorporates the above advantages in a simple and compact construction without adding appreciably to the bulk of present forms of minnow buckets.

A still further object of the invention is to provide an improved construction of minnow bucket including a bottom and a partition whereby improved strength is secured to enable the bucket to survive knocks and blows and other abuse to which such buckets are normally subjected.

A still further object of the invention is to combine in a single fitting the entire air control group with the provision of a gage to show at all times the air pressure obtaining in the air chamber.

With the foregoing and other objects in view, the invention will be more fully described hereinafter and more particularly pointed out in the appended claims.

In the drawings, in which like parts are denoted by the same reference characters throughout the several views, Figure 1 is a top plan view of an improved minnow bucket constructed in accordance with the present invention with the lid closed and the handle raised and with parts broken away and with parts shown in section;

Figure 2 is a vertical partly sectional view taken through the improved bucket on the line 2—2 in Figure 1;

Figure 3 is a view similar to Figure 2 of the top part of the bucket with the handle down and the lid partially raised;

Figure 4 is a vertical section taken on the line 4—4 in Figure 1;

Figure 5 is a horizontal partly sectional view taken on the line 5—5 in Figure 2;

Figure 6 is a vertical section taken through one of the catches on the line 6—6 in Figure 1;

Figure 7 is a horizontal section taken on the line 7—7 in Figure 4;

Figure 8 is a fragmentary top plan view of the trap lid and its spring hinge connection partly broken away;

Figure 9 is a vertical partly sectional view taken through the air control group on the line 9—9 in Figure 5;

Figure 10 is a horizontal partly sectional view taken on the line 10—10 in Figure 9;

Figure 11 is a vertical partly sectional view taken on the line 11—11 in Figure 9;

Figure 12 is a longitudinal section taken through the inflating valve casing; and Figure 13 is a similar view taken through the safety valve casing.

Referring more particularly to the drawings, 15 designates the flow line or mixing chamber disposed above and in communication with the air line 16 from the air chamber 17. This air line 16 passes through a partition 18 which separates the air chamber 17 from the water tank 19.

Where the air line 16 passes through the partition 18, welds 20 are made one on each side of the partition 18; and preferably the air line 16 is offset as it goes through such partition 18.

The partition 18 is preferably concavo-convex with its concavity disposed downward and toward the concavity of the concavo-convex bottom or base 21. The bottom is formed with an upstanding marginal flange 22 which lies against the external wall 23 of the cylindrical or other form of bucket 100. A weld 24 is made below the bottom 21 around the outer edge of the same and below the upstanding cylindrical flange 22, such weld joining the bottom to the bucket external wall 23 in such relationship that the downwardly presented convex surface of the bottom 21 is carried upwardly of the base line of the bucket wall 23 whereby the bucket bottom 21 is protected by the lower edge of the circumscribing lower edge portion of the bucket wall 23.

At the lowermost portion of the bucket wall 23, the metal is rolled outwardly and upwardly and wound around a wire or rod 25. The terminal end of the rolled edge is jammed tightly against the external surface of the bucket wall 23 so as to have a closed or smooth surface finish.

The partition 18 is preferably made with a downwardly extending integral flange 26 having a lower terminal inwardly-offset circular edge 27 for overlapping the upper edge portion of the bottom flange 22. In other words a crimp is made at 28 in the metal of the flange 26 to produce an interior space between this flange 27, the external bucket wall 23 and the upper edge of the bottom flange 22, which three parts are strongly connected by a weld 29. A weld 30 is also preferably produced between the outer peripheral edge portion of the partition 18 and the bucket side wall 23. In this way the partition 18 and bottom 21 mutually reinforce one another and contribute to the reinforcement of the external bucket wall 23. The parts are all finished off so as to have smooth surfaces. The welds may all be air tight fillet welds.

At the upper portion of the bucket the external wall 23 is preferably formed with an outwardly pressed bead 31 of relatively large radius spaced below a second externally pressed rounded bead 32 of a smaller radius. The latter bead is spaced below an internally pressed convex bead 33 constituting a reinforcement for the mouth of the bucket and constituting a shoulder on which the bucket lid 34 may seat. This bead 33 also constitutes a reinforcement for the upper mouth of the bucket in concert with a wire or rod 35 encased in the circularly rolled terminal edge 36 of the external bucket wall 23. The metal of these various walls and other parts may be of any desired gage.

As best seen in Figures 2 and 4, the flow line 15 has an initial vertical leg 15a which extends upwardly alongside the interior surface of the external bucket wall 23 to which it may be affixed as by a key or metal strap 37 (Fig. 7) welded or otherwise secured to such bucket wall 23. The flow line may be of substantially U-shaped form.

The air line 16 extends downwardly into the air chamber 17 where it connects as by a weld 38 with an air passage 39 in an air control fitting or casing 40 shown more particularly in Figures 9 and 10. Such air control casing has an air inlet opening 41 communicating with the air outlet opening 39 and between these openings is a valve seat 42 for a needle or other valve 43.

The air control casing 40 is mounted within the air chamber 17, the same having a flange 44 adapted to lie against the partition flange 26 and receive a wrench or other implement by which the air control casing 40 may be held against movement while the gage casing 45 is assembled thereto, for instance as by rotating the gage casing 45 which is disposed externally of the bucket to cause its externally threaded stud 46 to move into the internally threaded socket of the inner air control casing 40.

A gasket or washer 47 is interposed between the bucket wall 23 and the adjacent end wall of the gage casing 45. A stem 48 of the needle valve 43 extends outwardly through the gage casing 45 and is externally provided with a knurled hand wheel 49 for convenience in rotating the valve on and off its seat, the axial progression of the valve stem 48 being accomplished by a screw threaded section 50 on the valve stem receivable into a similarly threaded section in the gage casing 45.

A packing gland or stuffing box 51 on the outer end of the gage casing 45 packs the joint about the valve stem 48 and prevents leakage of air.

A standard air gage 52 is mounted in an upright position on the gage casing 45 externally of the bucket and in position to be conveniently read. This air gage has a threaded extension 53 for uniting the same to a threaded socket upstanding vertically in the central portion of the gage casing 45; the air gage 52 being at all times in open communication with an air chamber 54 internally of the gage casing 45 and communicating at all times with the air inlet port 41 of the inner air control casing 40 whereby the internal pressure of the air chamber 17 may at all times be read on the dial of the air gage 52.

As shown more particularly in Figures 11, 12, and 13, the gage casing 45 is not only provided with the upstanding threaded socket 55 for the air gage but also downwardly divergent threaded sockets 56 and 57 for receiving respectively the threaded nipples 58 and 59 of a safety casing valve 60 and an intake valve casing 61.

Referring more particularly to Figure 12, it will be seen that the casing 61 contains a valve core 62 similar to the valve cores used in the valve stems of automobile pneumatic tires. This valve core 62 includes the valve 63, the valve stem 64 and the threaded bushing 65 by which the valve core is threadedly engaged within the stem or casing 61. A conventional form of screw threaded valve cap 66 may be inserted over the outer open end of the intake valve casing 61.

Referring more particularly to Figure 13, a relief valve 67 is urged by a coil spring 68 against a seat 69 to maintain the pressure in the air chamber 17. This spring 68 is selected as of an appropriate load to maintain the required pressure in the air chamber 17. The load of the spring may be varied by screwing in or out a screw threaded cap 70 mounted in the outer end of the casing 60 and having a relief port 71 therein.

Referring more particularly to Figures 1 to 4 inclusive, the bucket is closed at the top of the water tank 19 by the main lid 34 which is hinged, as indicated at 72, to a bracket leaf 73 affixed by welding or otherwise to the side wall 23. A spring catch 74 is carried by the lid 34 diametrically opposite the hinge 72 and is shaped to snap over the upper rim 36 as shown in Figure 2.

The main lid 34 has a depressed central portion 75 having an opening 76 therein and giving access to the water tank 19 through a trap lid 77 hinged to the main lid 34 by a hinge structure 77a. A spring 78 included in said hinge structure biases the trap lid 77 to a closed position, shown in Figure 2.

Welded or otherwise affixed to the free end of the trap lid 77 as indicated at 79 are the two spring arms 80 and 81 of a catch. These spring arms 80, 81 are sprung to an outward position where they are interlocked with keepers 82 and 83 having overhanging upper members 82a and 83a for preventing the lifting of the catch arms 80, 81 or the opening of the trap lid 77. The keepers 82 and 83 (Fig. 6) may be stamped out and bent up from the material of the main lid 34. Such keepers are spaced apart so that when the spring arms 80, 81 are squeezed together, as shown in dotted lines in Figure 1, the catch arms 80, 81 may be lifted through the slot between the keepers 82, 83 thus freeing the catch and enabling the trap lid 77 to be lifted while the main lid 34 remains closed.

A bail 84 having a rotary handle 85 is shown in Figure 4 as having inturned trunnions 86 adapted to rotate in eyes in the upper portions of bail ears 87 outstanding from the wall of the bucket at the upper end thereof and having lower offset portions 87a affixed, as by welding, to the bucket wall 23.

An end portion 88 of the air line 16 extends up vertically for quite a distance into the lower portion of the flow line tube 15a which is open at its lower end to communicate interiorly in a free and uninterrupted manner with the body of water maintained in the water tank 19. It will be understood that this end portion 88 is of substantially smaller diameter than the internal diameter of the flow line tube 15a. The tube 15 is bent in an inverted U-shape so disposed as to place its delivery nozzle 89 well below the water line substantially close to the convex surface 18 in the bottom of the chamber 19.

In use, the water tank 19 or upper compartment is filled with water and the minnows placed therein. The lower compartment 17 is employed as an air tank or reservoir in which air is stored under pressure. The intake valve 61 is adapted to receive any chuck on an air hose of a gasoline air service station when the cap 66 is removed whereby air under pressure may be introduced through the casing 61, chamber 54 and port 41 into the air chamber 17 for the purpose of placing the same under a compression of a preselected value. Such value is determined by the load of the spring 68 which biases the relief valve 67 to its seat in the safety valve casing 60. By suitably rotating the screw plug 70 the load of this spring 68 may be adjusted. The relief valve 67 will open against the pressure of this spring 68 whenever the pre-selected pressure degree in the air chamber 17 is exceeded.

Air under compression in the air chamber 17 has constant access through the port 41 to the needle valve 43 and is controlled by this needle valve to the exit passage 39, to the air line 16 and thence to the flow line 15. The needle valve 43 may be rotated in one or the other direction to uncover or to mask variable port areas to control the volume of flow of compressed air to the lines 16 and 15. Compressed air flowing through the neck 88 and being liberated at the upper open end of the neck 88 into the larger diameter flow line tube 15a immediately expands and acts in the capacity of a siphon to draw up water from the body of water in the water tank 19 into the lower open extremity of the flow line tube 15a all about the narrower neck 88. This narrower neck 88 forms in concert with the larger tube 15a an annular chamber up through which the water is drawn by the lifting action of the compressed air issuing vertically upward through the open end of the neck 88. It will be understood that water is maintained in the water tank 19 up to a level which is substantially above that of the lower end of the flow line tube 15a. The combined air and water or aerated water will be carried along by the air pressure into the horizontal nozzle 89 which extends toward the center of the bucket where the open mouth of the nozzle will discharge such aerated water back into the compartment 19.

The nozzle at its free inner end is provided with a discharge orifice 90 of smaller diameter than the diameter of the nozzle 89 and such nozzle is swedged or tapered, as indicated at 91, from the larger diameter to the discharge orifice 90. This tapered section 91 and the reduced diameter of the discharge orifice 90 over the normal diameter of the nozzle 89 and tube 15 combine to create a back pressure on the water column ascending through the tube leg 15a and nozzle 89, this back pressure causing the air pressure to build up and the particles of air and water to leave the orifice 90 at a high velocity.

As water in the flow pipe 15 is aerated and lightened by the introduction of air, it rises in the flow pipe 15a and eventually moves into the nozzle 89. At the tip of the nozzle its flow rate is slightly retarded by the coonstriction 91 of the nozzle and the smallness of the discharge orifice 90 thus insuring that sufficient pressure be built up within the flow line and nozzle to cause the water to be sprayed through the orifice 90. This action or cycle is repeated by the constantly supplied air re-cycling the water through the flow line 15 and nozzle 89. Water is thus continually brought from the bottom of the water tank 19 and discharged into the top of such water tank in an aerated condition. Through this action air and water are brought together in the flow line 15 which acts as a mixing chamber and brings about the absorption of oxygen in the water. The neck 88 may extend about three inches above the partition 18 which is the bottom of the water tank 19. The nozzle 89 is disposed well below the water line substantially close to the convex bottom 18 of the chamber 19. Of course the water in the water tank 19 will naturally well up in the flow line tube 15a to the same level as prevails in the water tank 19. This will normally be up to a level substantially above the upper open end of the neck 88 so that the compressed air will discharge upwardly from the neck 88 into a column of water at all times present in the flow line tube 15a.

While I have disclosed herein the best form of the invention known to me at the present time, I desire it to be understood that I reserve the right to make changes and modifications in the herein described embodiment of the invention provided such changes fall within the scope of the following claims.

I claim:

1. A minnow bucket comprising a bucket body, a partition dividing same into air and water compartments, a flow line in the water compartment, an air line to the air compartment, an air control fitting having an air outlet connected to the air line and an inlet port communicating with the air compartment, a valve between the air outlet and inlet port, a gage casing on the outside of the bucket body having means extending into the body wall and coupled to the fitting, a stem for the valve threadedly engaged in the casing and projecting therebeyond, said casing having an internal chamber in continuous communication through the port with the air compartment, a gage connected to said chamber, an air intake valve unit carried by the casing and connecting with the chamber, and a relief valve unit also carried by the casing and connecting with the chamber.

2. A minnow bucket comprising a bucket body, a partition dividing same into air and water compartments, a flow line in the water compartment, an air line to the flow line originating in the air compartment, an air control fitting having an air outlet connected to the air line and an inlet port communicating with the air compartment, a valve between the air outlet and inlet port, a gage casing on the outside of the bucket body having means extending into the body wall and coupled to said fitting, operating means for the valve mounted in and projecting outwardly of said casing, said casing having an internal chamber in continuous communication through the port with the air compartment, a gage carried by said casing and communicating with said chamber, and an air intake valve unit carried by the casing and connecting with the chamber.

3. A minnow bucket comprising a bucket body, a partition dividing same into air and water compartments, a flow line in the water compartment, an air line to the flow line originating in the air compartment, an air control fitting having an air outlet connected to the air line and an inlet port communicating with the air compartment, said air outlet and said inlet port being relatively offset and said fitting having a valve seat between said air outlet and the inlet port, a valve movably mounted for closing and opening with respect to said seat, a casing on the outside of the bucket body having means extending into the body wall and coupled to said fitting, said casing having an internal chamber in continuous communication through the port with the air compartment, a stem connected to operate said valve movably mounted through the outer portion of said casing and an air intake valve unit carried by the casing and connecting with the chamber.

4. A minnow bucket comprising a bucket body, a partition dividing same into air and water compartments, a flow line in the water compartment, an air line to the flow line originating in the air compartment, an air control fitting in the air compartment having an air outlet connected to the air line and an inlet port communicating with the air compartment, said fitting having a valve seat between the air outlet and the inlet port, a casing mounted on the outside of the bucket body opposite to the fitting and having an internal chamber communicating with the air inlet port of said fitting, a valve mounted in said casing to move toward and from said valve seat, and an air intake valve unit carried by said casing and connecting with the chamber.

5. A minnow bucket comprising a bucket body, a partition dividing the same into air and water compartments, an air control fitting mounted on the body and having an air outlet communicating with the water compartment and an inlet port communicating with the air compartment, a valve between the air outlet and inlet port, a gage casing on the outside of the bucket body having an internal chamber in continuous communication through the port with said air compartment, operating means for the valve mounted in and projecting outwardly of said casing, a gage carried by said casing and communicating with said chamber, and an air intake valve unit carried by said casing and communicating with said chamber.

REID CLARK.

REFERENCES CITED

The following references are of record in the file of this patent:

UNITED STATES PATENTS

| Number | Name | Date |
|---|---|---|
| 170,697 | Anderson | Dec. 7, 1875 |
| 245,441 | Burnett | Aug. 9, 1881 |
| 317,110 | Foulds | May 5, 1885 |
| 366,650 | Danheiser | July 19, 1887 |
| 370,681 | Caldwell et al. | Sept. 27, 1887 |
| 457,741 | Kimball | Aug. 11, 1891 |
| 718,228 | Strandberg | Jan. 13, 1903 |
| 852,566 | Lane | May 7, 1907 |
| 1,126,640 | Jones | Jan. 26, 1915 |
| 1,128,327 | Keith | Feb. 16, 1915 |
| 1,261,018 | Gebhardt | Apr. 2, 1918 |
| 1,485,555 | Daykin | Mar. 4, 1924 |
| 1,568,730 | Gleason | Jan. 5, 1926 |
| 1,574,783 | Beth | Mar. 2, 1926 |
| 1,604,971 | Churchill et al. | Nov. 2, 1926 |
| 1,616,125 | Holman | Feb. 1, 1927 |
| 1,843,563 | Koernschild | Feb. 2, 1932 |
| 1,942,935 | Reutter | Jan. 8, 1934 |
| 1,964,838 | Weinberg | July 3, 1934 |
| 2,033,011 | Schilling | Mar. 3, 1936 |
| 2,194,067 | Campbell | Mar. 19, 1940 |

FOREIGN PATENTS

| Number | Country | Date |
|---|---|---|
| 142,258 | Austria | June 25, 1935 |